United States Patent Office.

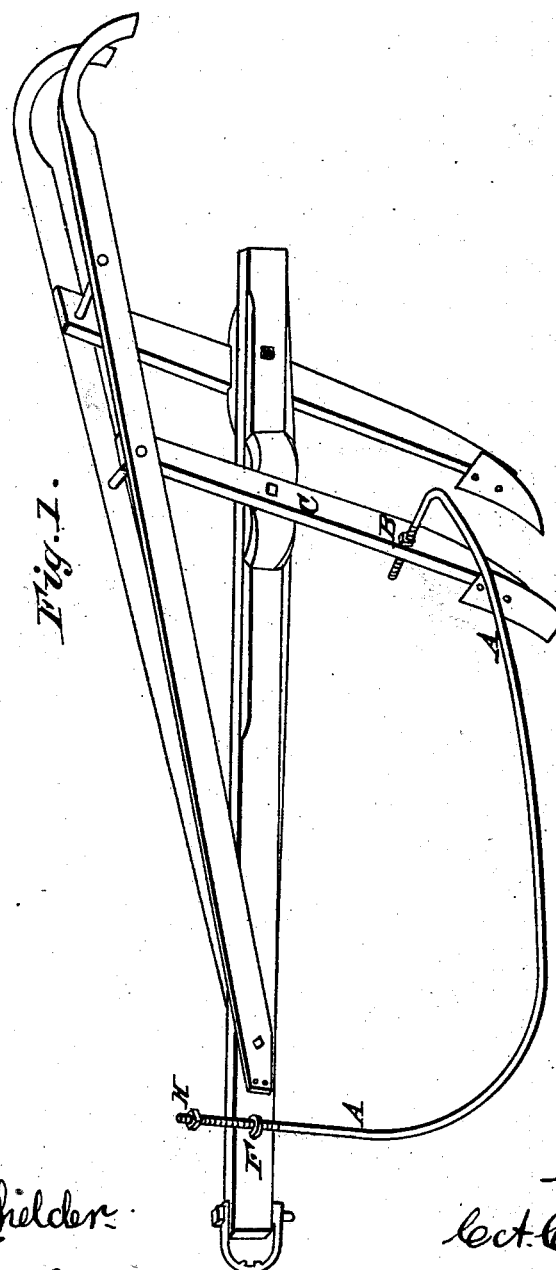

CHARLES A. COGSWELL, OF MAQUOKETA, IOWA.

Letters Patent No. 78,186, dated May 26, 1868; antedated May 12, 1868.

IMPROVEMENT IN CULTIVATORS.

The Schedule referred to in these Letters Patent and making part of the same.

TO ALL WHOM IT MAY CONCERN:

Be it known that I, CHARLES A. COGSWELL, of Maquoketa, in the county of Jackson, in the State of Iowa, have invented a new and useful Improvement in Cultivators; and I do hereby declare the following to be a full and exact description of the construction and operation of the same, reference being had to the accompanying drawings, and to the letters of reference marked thereon, in which—

Figure 1 is a perspective view.

My invention consists of attaching, to the beam of any ordinary cultivator or double-shovel plough, the curved rod represented at A, fig. 1. The rod A is secured to the standard C by means of the nut B, and is fastened to the plough-beam by means of the eye F, the rod fitting the guide or eye loosely, allowing the rod free play in an upward and downward direction, the nut H preventing the rod from slipping through the guide.

The operation of the machine is as follows:

In the hilling up of potatoes and other crops whose leaves and stems bend down to the earth, it is necessary to raise the stems of the plants to an upright position in order to prevent them from being covered by the operation of the plough or cultivator. For this purpose the rod A is provided, and curved in the manner indicated in the drawing, for the purpose of lifting the stems and leaves of the plants to an upright position in advance of the shovels of the plough.

What I claim as my invention, and desire to secure by Letters Patent, is—

The attachment of the curved rod A to the standard and beam of the ordinary shovel-plough or cultivator, in the manner and for the purpose above specified.

C. A. COGSWELL.

Witnesses:
    FRED. E. BACHELDER,
    E. A. FULLER.